US012473755B2

(12) United States Patent
Lin et al.

(10) Patent No.: US 12,473,755 B2
(45) Date of Patent: Nov. 18, 2025

(54) INTERLINK LOCK MECHANISM FOR MULTI-LAYERED DRAWER FURNITURE

(71) Applicant: HU HUA METAL PRODUCTS CO., LTD, Suzhou (CN)

(72) Inventors: Shu Hua Lin, Suzhou (CN); Shu Jiuan Lin, Suzhou (CN); Ping Shun Kao, Suzhou (CN)

(73) Assignee: HU HUA METAL PRODUCTS CO., LTD, Suzhou (CN)

(*) Notice: Subject to any disclaimer, the term of this patent is extended or adjusted under 35 U.S.C. 154(b) by 122 days.

(21) Appl. No.: 18/486,544

(22) Filed: Oct. 13, 2023

(65) Prior Publication Data

US 2025/0072604 A1 Mar. 6, 2025

(30) Foreign Application Priority Data

Aug. 28, 2023 (CN) ......................... 202322304579.8

(51) Int. Cl.
*E05B 65/464* (2017.01)

(52) U.S. Cl.
CPC .................................. *E05B 65/464* (2013.01)

(58) Field of Classification Search
CPC .... E05B 65/462; E05B 65/463; E05B 65/464; A47B 88/50; A47B 2210/0086; A47B 2097/008
See application file for complete search history.

(56) References Cited

U.S. PATENT DOCUMENTS

| | | | | |
|---|---|---|---|---|
| 5,333,949 A * | 8/1994 | McGregor | E05B 65/464 | 312/221 |
| 5,352,030 A * | 10/1994 | Derle | E05B 65/464 | 312/220 |
| 6,238,024 B1 * | 5/2001 | Sawatzky | E05B 65/464 | 312/221 |
| 6,568,771 B2 * | 5/2003 | Gentili | E05B 65/464 | 312/217 |
| 7,637,576 B2 * | 12/2009 | Sevillano Gil | E05B 65/464 | 312/221 |
| 2005/0023941 A1 * | 2/2005 | Chiu | E05B 65/464 | 312/221 |
| 2007/0284976 A1 * | 12/2007 | Huang | E05B 65/464 | 312/220 |

(Continued)

FOREIGN PATENT DOCUMENTS

| | | |
|---|---|---|
| CN | 106559966 A | 4/2017 |
| CN | 213370804 U | 6/2021 |

(Continued)

*Primary Examiner* — Andrew Roersma
(74) *Attorney, Agent, or Firm* — Nitin Kaushik

(57) ABSTRACT

Disclosed is an interlink lock mechanism for multi-layered drawer furniture. A cabinet is provided with the interlink lock mechanism, and the interlink lock mechanism includes a track seat, two fixing assemblies, and a plurality of self-locking adjustment assemblies. Each of the self-locking adjustment assemblies includes a connecting rod, an opening block, and two functional blocks, where a gap between the two fixing assemblies can allow only one opening block to rotatably enter between the two functional blocks or between the functional block and the fixing block. According to the present application, two or more drawers of the cabinet can be prevented from being drawn out at the same time.

12 Claims, 13 Drawing Sheets

(56) References Cited

U.S. PATENT DOCUMENTS

| | | | | |
|---|---|---|---|---|
| 2008/0074017 | A1* | 3/2008 | Ruan | E05B 65/464 312/215 |
| 2024/0245212 | A1* | 7/2024 | Chen | E05B 65/464 |
| 2024/0309681 | A1* | 9/2024 | Chen | A47B 88/49 |
| 2024/0376749 | A1* | 11/2024 | Chen | A47B 88/467 |
| 2024/0418013 | A1* | 12/2024 | Chen | E05B 65/464 |

FOREIGN PATENT DOCUMENTS

| | | | | | |
|---|---|---|---|---|---|
| CN | 214669542 | U | | 11/2021 | |
| CN | 115104867 | A | * | 9/2022 | |
| CN | 217390272 | U | * | 9/2022 | |
| CN | 218390326 | U | * | 1/2023 | |
| CN | 116491775 | A | * | 7/2023 | |
| CN | 116831400 | A | * | 10/2023 | |
| EP | 1340874 | A1 | * | 9/2003 | |
| EP | 1500763 | A2 | * | 1/2005 | E05B 65/464 |
| GB | 2455550 | A | * | 6/2009 | E05B 65/464 |
| KR | 101823370 | B1 | * | 1/2018 | E05B 65/463 |

* cited by examiner

INTERLINK LOCK MECHANISM FOR MULTI-LAYERED DRAWER FURNITURE

CROSS-REFERENCE TO RELATED APPLICATIONS

The application claims priority to Chinese patent application No. 202322304579.8, filed on Aug. 28, 2023, the entire contents of which are incorporated herein by reference.

TECHNICAL FIELD

The present application relates to the technical field of drawer assemblies, and particularly relates to an interlink lock mechanism for multi-layered drawer furniture.

BACKGROUND

At present, drawers are widely used, and products such as furniture cabinets, tool cabinets, tool boxes and tool tables often have a plurality of drawers. With respect to drawer furniture with two or more than two drawers, when one of the drawers is pulled open, it often drives adjacent drawers to be pulled out as well. When the plurality of drawers are pulled open at the same time, there will be a risk that a cabinet loses its balance to topple as objects in the drawers are too heavy.

An objective of the present application is to provide an interlink lock mechanism for multi-layered drawer furniture, to solve the above problem.

SUMMARY

To solve the above technical problem, the present application provides an interlink lock mechanism for multi-layered drawer furniture. The interlink lock mechanism for multi-layered drawer furniture features a concise structure and an ingenious design, two or more than two drawers of the cabinet can be prevented from being drawn out at the same time, and the technical problem that the cabinet rolls over when a plurality of drawers are pulled out at the same time is solved.

The technical solution of the present application is as follows: the present application provides an interlink lock mechanism for multi-layered drawer furniture, the drawer furniture including a cabinet and at least two drawers distributed up and down in the cabinet, a guide rail assembly being arranged between each drawer and the cabinet and including a drawer slide rail mounted on a side surface of the drawer, a cabinet slide rail mounted on the cabinet, and a drive member arranged at an end of the drawer slide rail, and the drawer slide rail being matched with the cabinet slide rail and the drive member being capable of sliding along the cabinet slide rail, wherein a side wall of the cabinet is provided with the interlink lock mechanism, and the interlink lock mechanism includes a track seat, fixing assemblies located at both ends of the track seat, and a plurality of self-locking adjustment assemblies located on the track seat, the track seat being arranged in a height direction of the cabinet, and the plurality of self-locking adjustment assemblies being arranged at an interval in a height direction of the track seat;

each of the self-locking adjustment assemblies includes a connecting rod, an opening block, and two functional blocks, wherein the functional blocks are slidably connected to the track seat, two adjacent self-locking adjustment assemblies are defined as an upper self-locking adjustment assembly and a lower self-locking adjustment assembly, the two functional blocks of a same self-locking adjustment assembly are defined as a functional block A and a functional block B, an upper end of the connecting rod is connected to the functional block A, and a lower end of the connecting rod is connected to the functional block B;

the fixing assemblies located at both ends of the track seat are respectively defined as an upper fixing assembly and a lower fixing assembly, and the upper fixing assembly is located above the self-locking adjustment assembly adjacent thereto; and the lower fixing assembly is located below the self-locking adjustment assembly adjacent thereto, and an opening block is further arranged between the upper fixing assembly and the lower fixing assembly;

a gap between a lower end of the upper fixing assembly and an upper end of the lower fixing assembly can allow only one opening block to rotatably enter between the two functional blocks or between one functional block and one fixing block;

the opening block is located between the two functional blocks of the two adjacent self-locking adjustment assemblies and is rotatably connected to the functional blocks, to adjust a distance between the two functional blocks depending on whether the opening block is rotated;

or/and the opening block is located between one fixing assembly and the functional block of one self-locking adjustment assembly and is rotatably connected to the fixing assembly and the functional block, to adjust a distance between the fixing assembly and the functional block depending on whether the opening block is rotated.

Further, the driver member is a roller, and a center shaft of the roller is rotatably connected to the end of the drawer slide rail:

the end of the drawer slide rail is provided with an arc-shaped groove matched with the roller; and in a closed state of the drawer, the roller is located in the arc-shaped groove.

Further, both ends of the opening block are rotatably connected to the functional blocks of the two adjacent self-locking adjustment assemblies through a rotating shaft;

a surface of the opening block contacting with the drive member is provided with a cam structure, a surface of the opening block away from the drive member is provided with a first sloping structure, the functional block is provided with a second sloping structure matched with the first sloping structure, and the drive member is moved to contact with the cam structure to drive the opening block to rotate, so that the first sloping structure enters between the two functional blocks or between the functional block and the fixing assembly to push away the functional block and the fixing assembly.

Further, the cam structure is a first protrusion extending toward a side close to the drawer on a surface of the opening block close to the drive member.

Further, the surface of the opening block close to the drive member at an end opposite to the first protrusion is provided with a second protrusion, and the second protrusion is pushed by the drive member to drive the opening block to screw out between the two functional block or between one functional block and one fixing assembly.

Further, threaded sections with external threads are arranged at both ends of the connecting rod, and thread directions of the threaded sections at both ends are opposite, the functional blocks are provided with corresponding threaded holes, and the connecting rod is in threaded connection to the functional blocks; and a distance between adjacent drawers can be adjusted by adjusting depths of both ends of the connecting rod screwed into the threaded holes.

Further, each of the fixing assemblies includes a protecting cover, a fixing rod, and a fixing block, the protecting cover is fixed to the track seat, both ends of the fixing rod are in threaded connection to the protecting cover and the fixing block, respectively, and depths of both ends of the fixing rod respectively screwed into the protecting cover and the fixing block can be adjusted.

Further, a side surface of the track seat is provided with a limiting convex rib extending in a height direction, a side surface of the functional block is provided with a limiting groove matched with the limiting convex rib, and the limiting convex rib can be clamped into the limiting groove.

Further, the layers of the drawers are one more than the self-locking adjustment assemblies.

Further, both ends of the connecting rod are respectively connected to the functional block through adjusting members, both ends of the connecting rod are provided with threaded cavities, each of the adjusting members is provided with a screw with a thread, one end of the adjusting member is connected to the functional block, and meanwhile, the screw is inserted into the threaded cavity of the connecting rod and an insertion depth can be adjusted.

Further, each of the fixing assemblies includes a protecting cover, an adjusting member, and a fixing block, the adjusting member is provided with a screw with a thread, the protecting cover is provided with a threaded cavity, one end of the adjusting member is connected to the fixing block, and a depth of the screw of the adjusting member inserted into the threaded cavity of the protecting cover can be adjusted.

Further, the functional block and/or the fixing block are respectively provided with a T-shaped groove, one end of the adjusting member is provided with a hanging table, and the hanging table is clamped into the T-shaped groove.

The present application has the following beneficial effects:

In the present application, by matching the self-locking adjustment assemblies with the guide rail assemblies, an interlocking function between adjacent drawers is achieved under an interlocking action of the self-locking adjustment assemblies of the drawers, which is specifically as follows: as the gap between the lower end of the upper fixing assembly and the upper end of the lower fixing assembly only can allow one opening block to rotatably enter between the two functional blocks or between one functional block and the fixing block, when a certain drawer is pulled, the corresponding drive member will slide through the surface of the opening block and drive the opening block of the corresponding self-locking adjustment assembly to rotate to push away the adjacent functional block, and in this case, the drawer is opened: meanwhile, the adjacent connecting rod and the functional block will be pushed to move longitudinally to clamp the drive members of other drawers, so that the drawers cannot move, i.e., one drawer can be pulled out once. The drawers in other layers will not move following the drawer, and therefore, linkage of all drawers can be achieved by the mechanism. Thus, two or more than two drawers of the cabinet can be prevented from being drawn out at the same time, and the technical problem that the cabinet rolls over when the plurality of drawers are pulled out at the same time is solved. The stability of the furniture is improved, the using safety is enhanced, and the using quality of the product is ensured.

REFERENCE NUMERALS IN THE DRAWINGS

Figure 1:
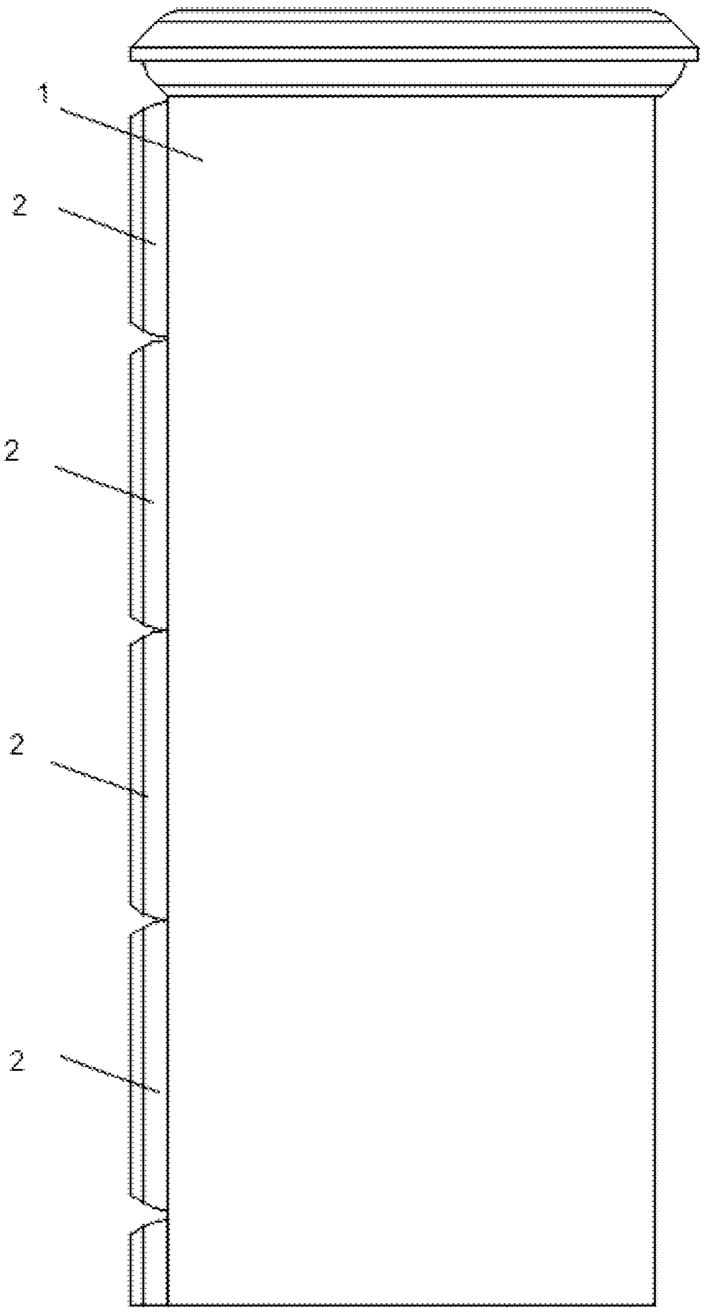
FIG. 1 is a first side view of an embodiment 1 (in a closed state of the drawers).

- cabinet 1;
- drawer 2;
- drawer slide rail 31, cabinet slide rail 32, arc-shaped groove 321, drive member 33;
- track seat 4, upper fixing assembly 41, protecting cover 411, fixing rod 412, fixing block 413, lower fixing assembly 42, limiting convex rib 43;
- self-locking adjustment assembly 5, connecting rod 51, threaded section 511, threaded cavity 512, opening block 52, cam structure 521, first sloping structure 522, rotating shaft 523, second protrusion 524, functional block A 53, second sloping structure 531, limiting groove 532, T-shaped groove 533, functional block B 54;
- adjusting member 55, screw 551, hanging table 552, polygonal tightening portion 553.

DETAILED DESCRIPTION OF THE EMBODIMENTS

To understand the technical means of the present application more clearly and implement the present application according to the content in the description, specific implementations of the present application will be further described in detail below in combination with drawings and embodiments. The embodiments below are used for describing the present application rather than limiting the scope of the present application.

Figure 2:
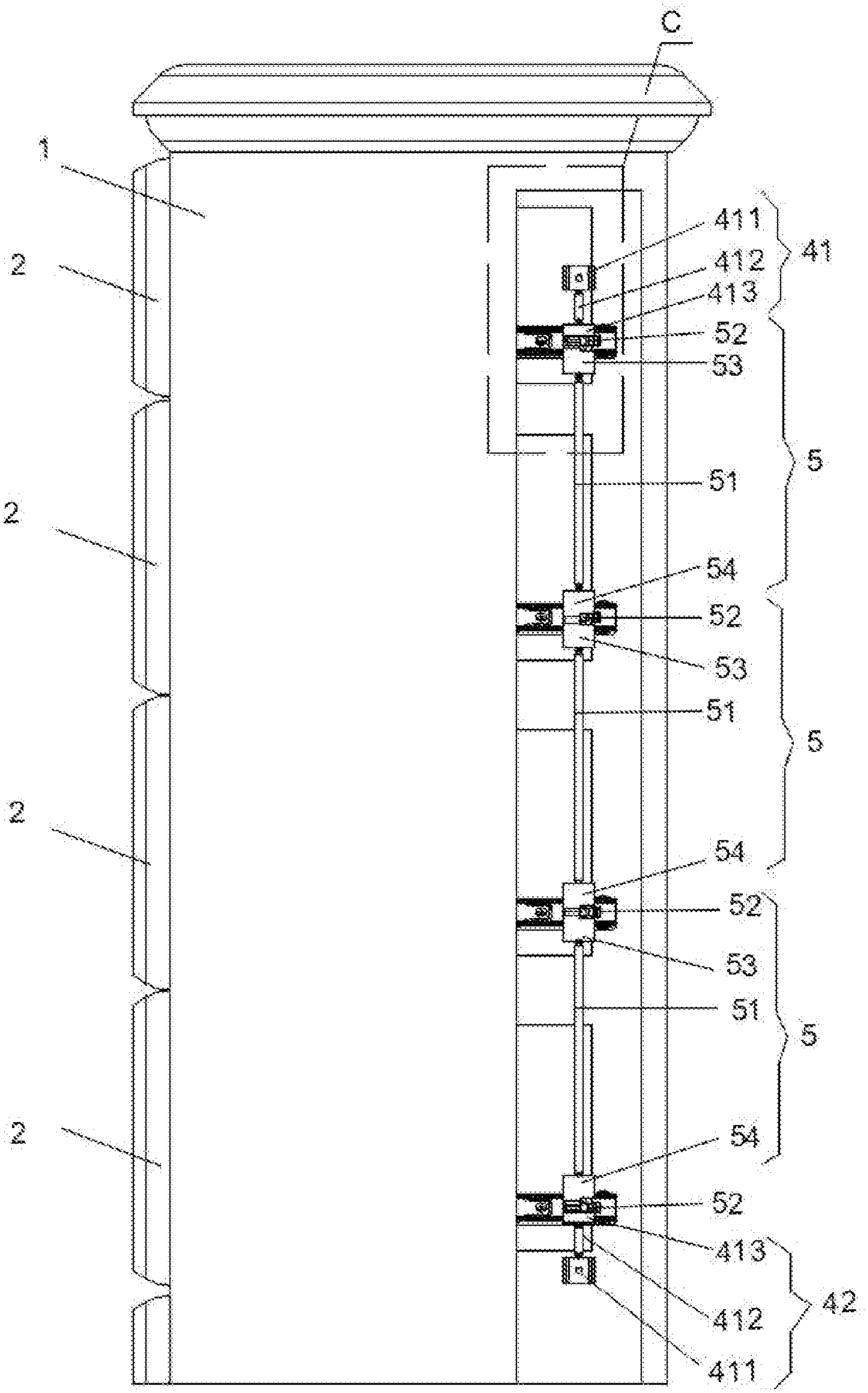
FIG. 2 is a second side view of the embodiment 1 (in a closed state of the drawers, and to exhibit an internal structure, a part of assemblies are not mounted).
Figure 3:
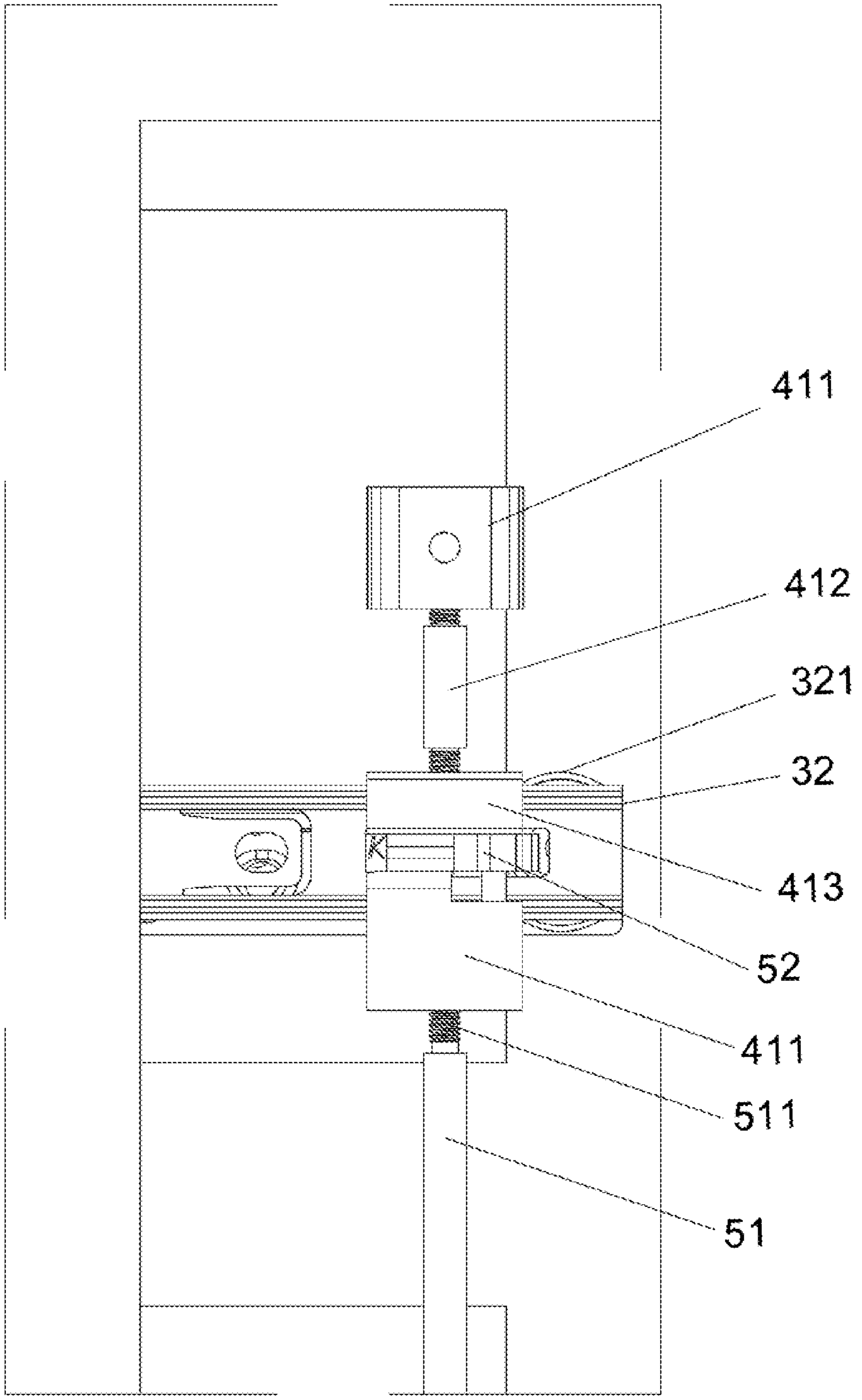
FIG. 3 is a partially enlarged drawing of C in FIG. 2.
Figure 4:
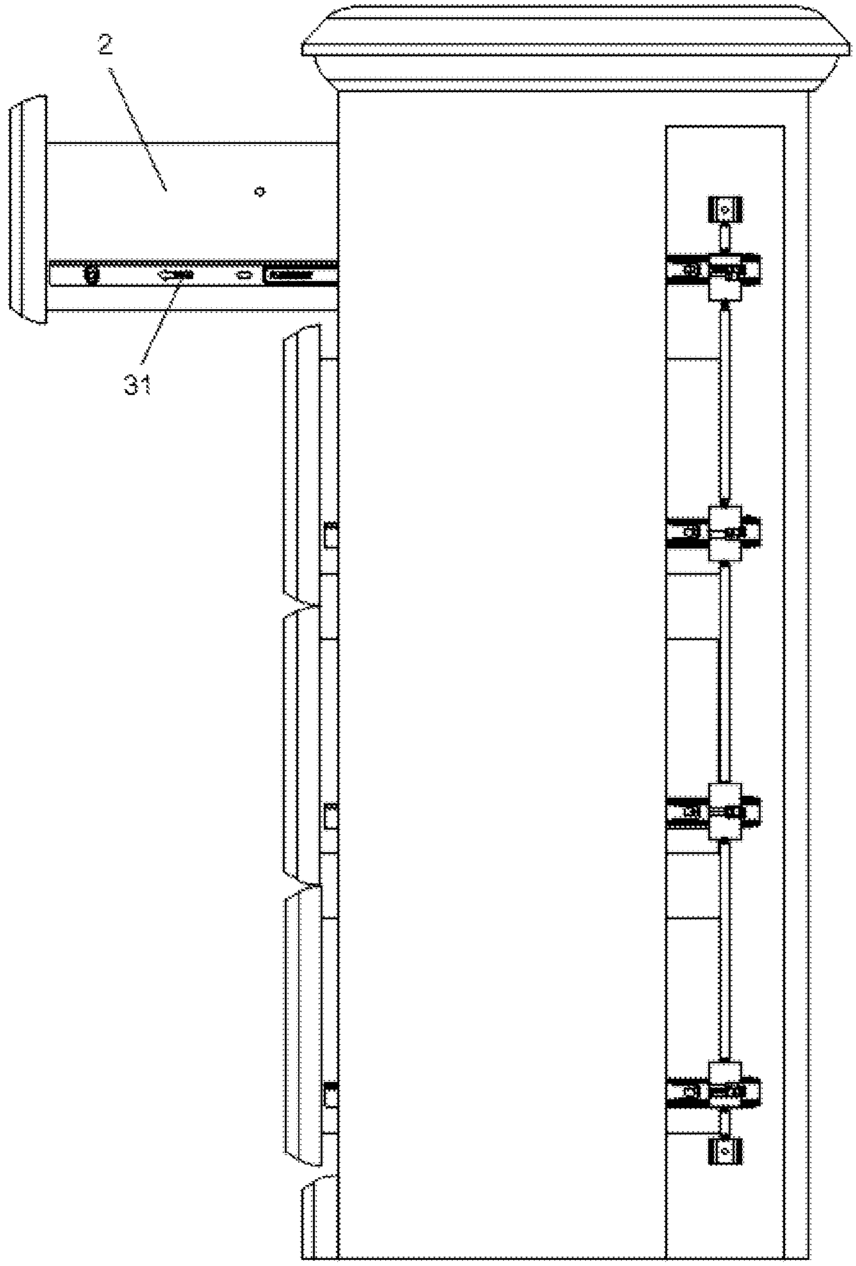
FIG. 4 is a schematic diagram of the embodiment 1 with one drawer in an opened state.
Figure 9:
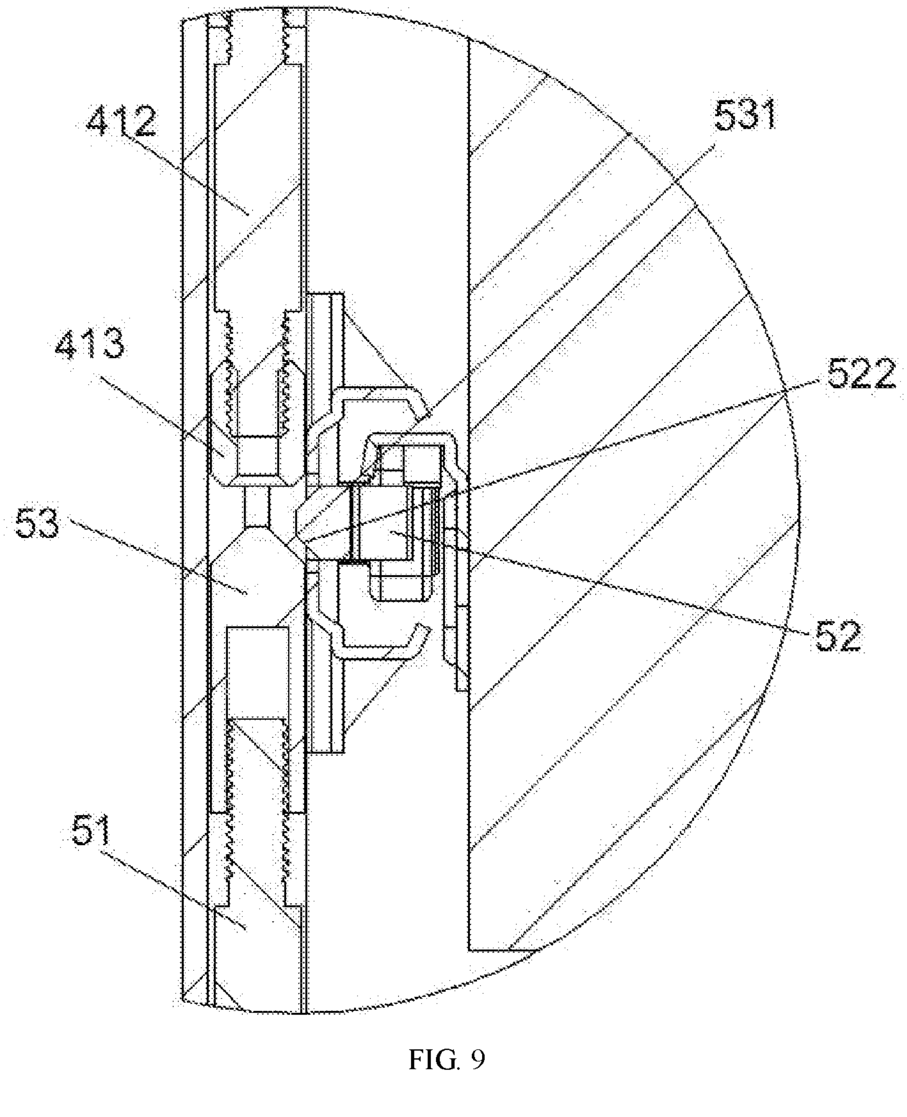
FIG. 9 is a partially enlarged drawing of E in FIG. 8.
Figure 10:
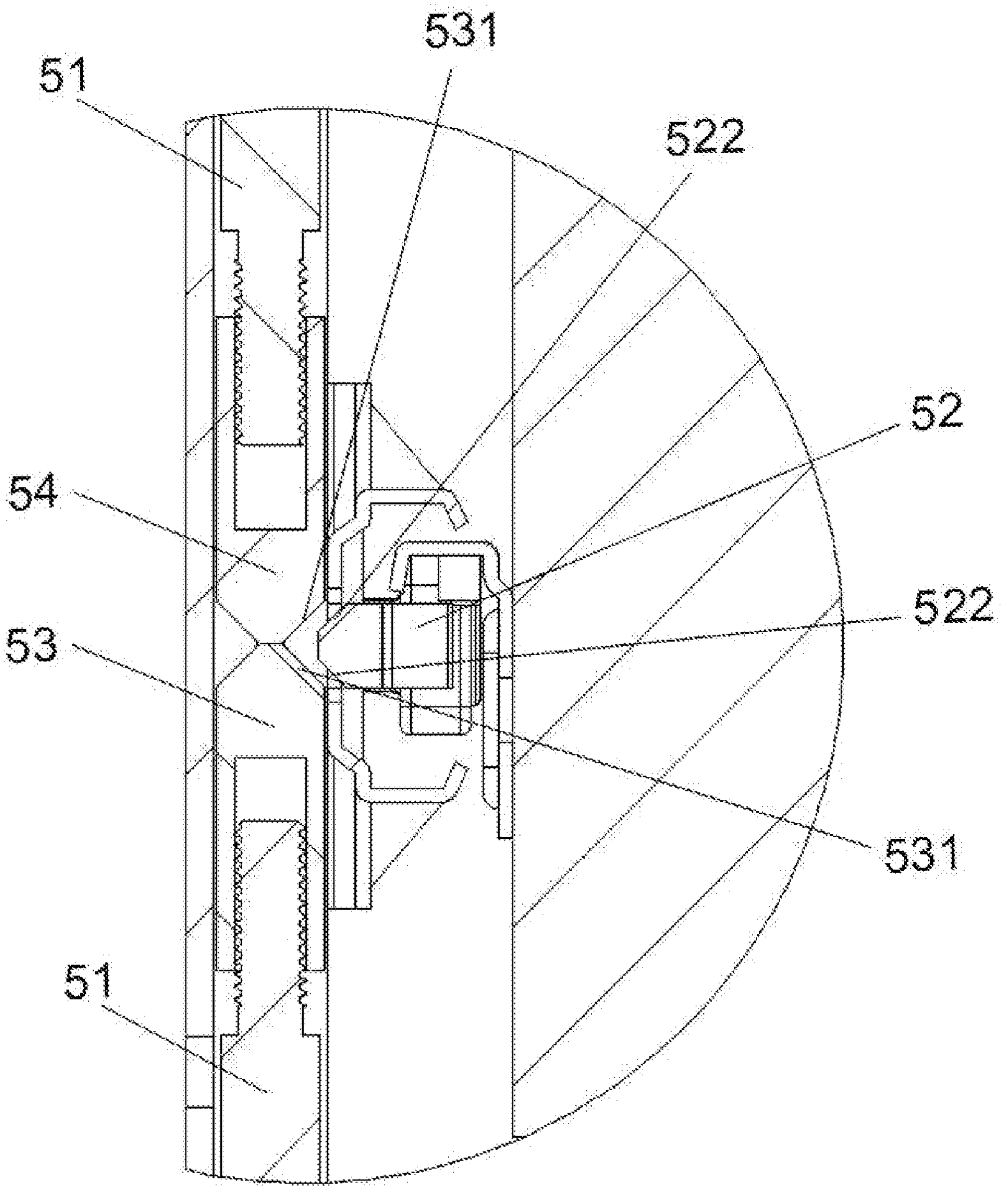
FIG. 10 is a partially enlarged drawing of F in FIG. 8.
Figure 11:
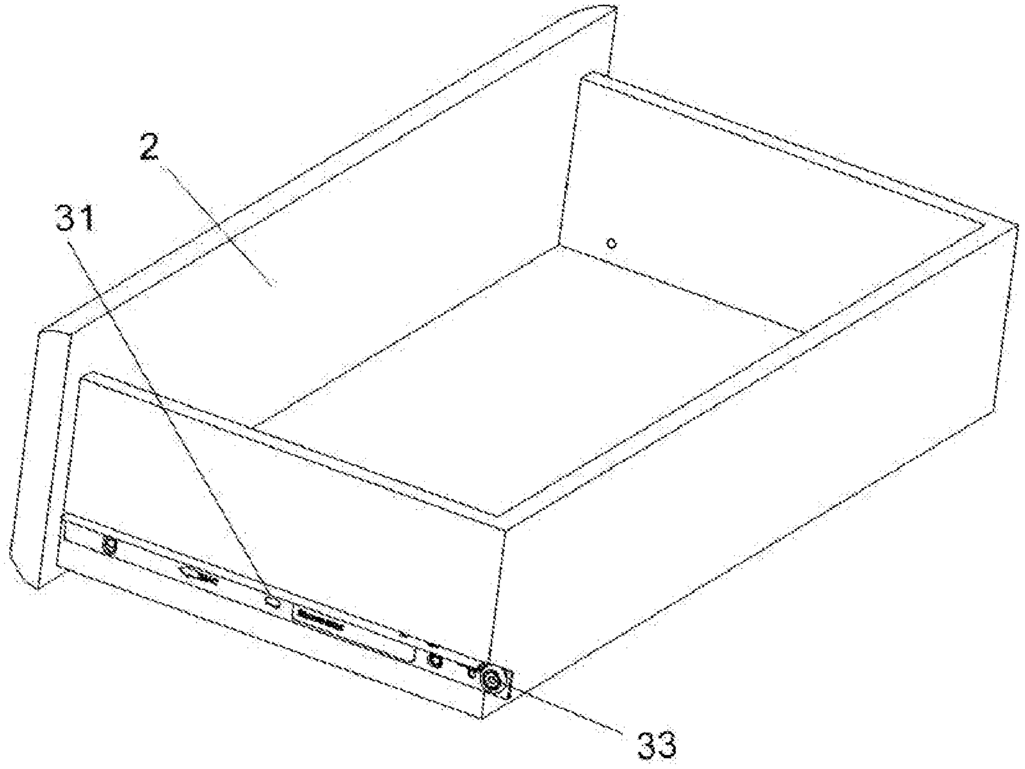
FIG. 11 is a schematic structural diagram of a certain drawer in the embodiment 1.

Embodiment 1: an interlink lock mechanism for multi-layered drawer furniture, as shown in FIGS. 1-11, the drawer furniture including a cabinet 1 and at least two drawers 2 distributed up and down in the cabinet; in the embodiment, by taking four layers of drawers as an example, the drawers are defined as first to fourth layers of drawers in sequence from top to bottom: a guide rail assembly is arranged between each drawer and the cabinet and includes a drawer slide rail 31 mounted on a side surface of the drawer 2 (as shown in FIG. 4 and FIG. 11), a cabinet slide rail 32 mounted on the cabinet 1, and a drive member 33 arranged at an end of the drawer slide rail 31, and the drawer slide rail 31 is matched with the cabinet slide rail 32 and the drive member 33 is capable of sliding along the cabinet slide rail 32;

a side wall of the cabinet 1 is provided with the interlink lock mechanism, and the interlink lock mechanism includes a track seat 4, fixing assemblies (respectively defined as an upper fixing assembly 41 and a lower fixing assembly 42) located at both ends of the track seat 4, and a plurality of self-locking adjustment assemblies 5 located on the track seat, the track seat 4 being arranged in a height direction of the cabinet, and the plurality of self-locking adjustment assemblies 5 being arranged at an interval in a height direction of the track seat;

each of the self-locking adjustment assemblies 5 includes a connecting rod 51, an opening block 52, and two functional blocks (the two functional blocks of the same self-locking adjustment assembly are respectively defined as a functional block A 53 and a functional block B 54), wherein the functional blocks are slidably connected to the track seat 4, two adjacent self-locking adjustment assemblies are respectively defined as an upper self-locking adjustment assembly and a lower self-locking adjustment assembly, an upper end of the connecting rod 51 is connected to the functional block A 53, and a lower end of the connecting rod 51 is connected to the functional block B 54;

the upper fixing assembly 41 is located above the self-locking adjustment assembly adjacent thereto; and the lower fixing assembly 42 is located below the self-locking adjustment assembly adjacent thereto, and an opening block 52 is further arranged between the upper fixing assembly and the lower fixing assembly; and one of the drawers 2 is pulled to drive the drive member 33 thereof to move so as to drive the opening block 52 to rotate, so that the functional block B 54 of the upper self-locking adjustment assembly and the functional block A 53 of the lower self-locking adjustment assembly are away from each other to drive the connecting rod 51 of the upper self-locking adjustment assembly and the functional block B 54 located at the lower end of the connecting rod to move downwards.

When the opening block 52 is located between the two functional blocks (i.e., the functional block A 53 and the functional block B 54), the opening block 52 rotates to drive the two functional blocks to be away from each other, and in the embodiment, both the opening block and the functional blocks move and are away from each other up and down; and when the opening block 52 is located between the upper fixing assembly 41 (or the lower fixing assembly 42) and one functional block, the opening block 52 rotates to drive the upper fixing assembly 41 (or the lower fixing assembly 42) and the functional block to be away from each other. Moreover, in the embodiment, the fixing assembly is fixed to the track seat, so that the functional block is away toward the direction away from the fixing assembly. The latter case only exists between the upper fixing assembly and the uppermost self-locking adjustment assembly and between the lower fixing assembly and the lowest self-locking adjustment assembly.

In the embodiment, a gap between a fixing block 413 of the upper fixing assembly 41 and a fixing block 413 of the lower fixing assembly 42 can allow only one opening block 52 to rotatably enter between the two functional blocks (i.e., the functional block A 53 and the functional block B 54) or between one functional block (i.e., the functional block A 53 and the functional block B 54) and one fixing block 413.

The gap herein is not a linear distance between the lower end of the upper fixing assembly 41 and the upper end of the lower fixing assembly 42 but a gap containing all the functional blocks, the connecting rod, and the opening block. The gap can only allow one opening block 52 to rotate but cannot allow two opening blocks 52 to rotate. Therefore, the opening blocks 52 at other positions all are leaned against and cannot rotate. Thus, only one drawer 2 can be opened, and more than two drawers 2 cannot be opened at the same time.

Figure 5:
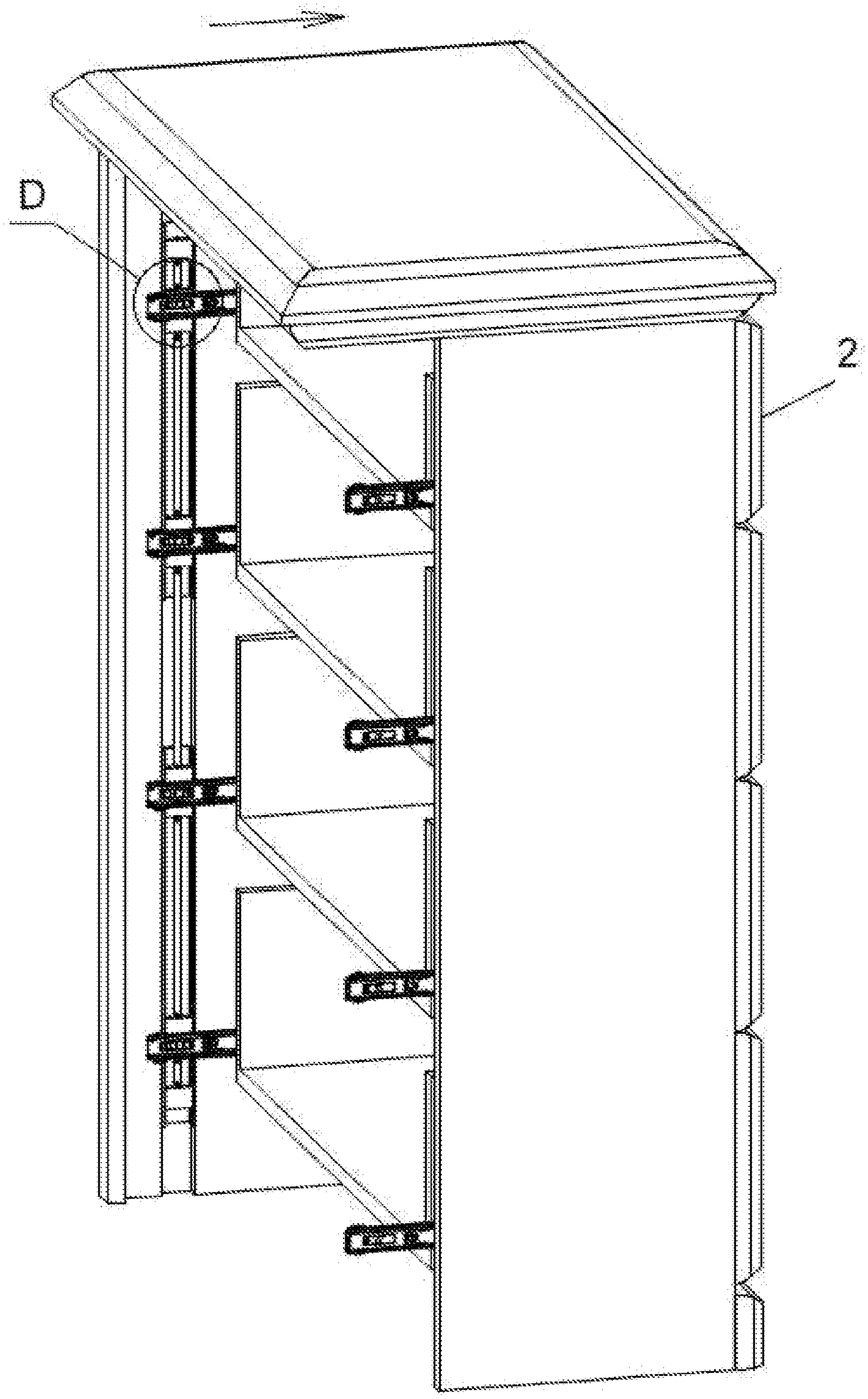
FIG. 5 is a structural schematic diagram of the embodiment 1 (an arrow represents an opening direction of the drawer).
Figure 6:
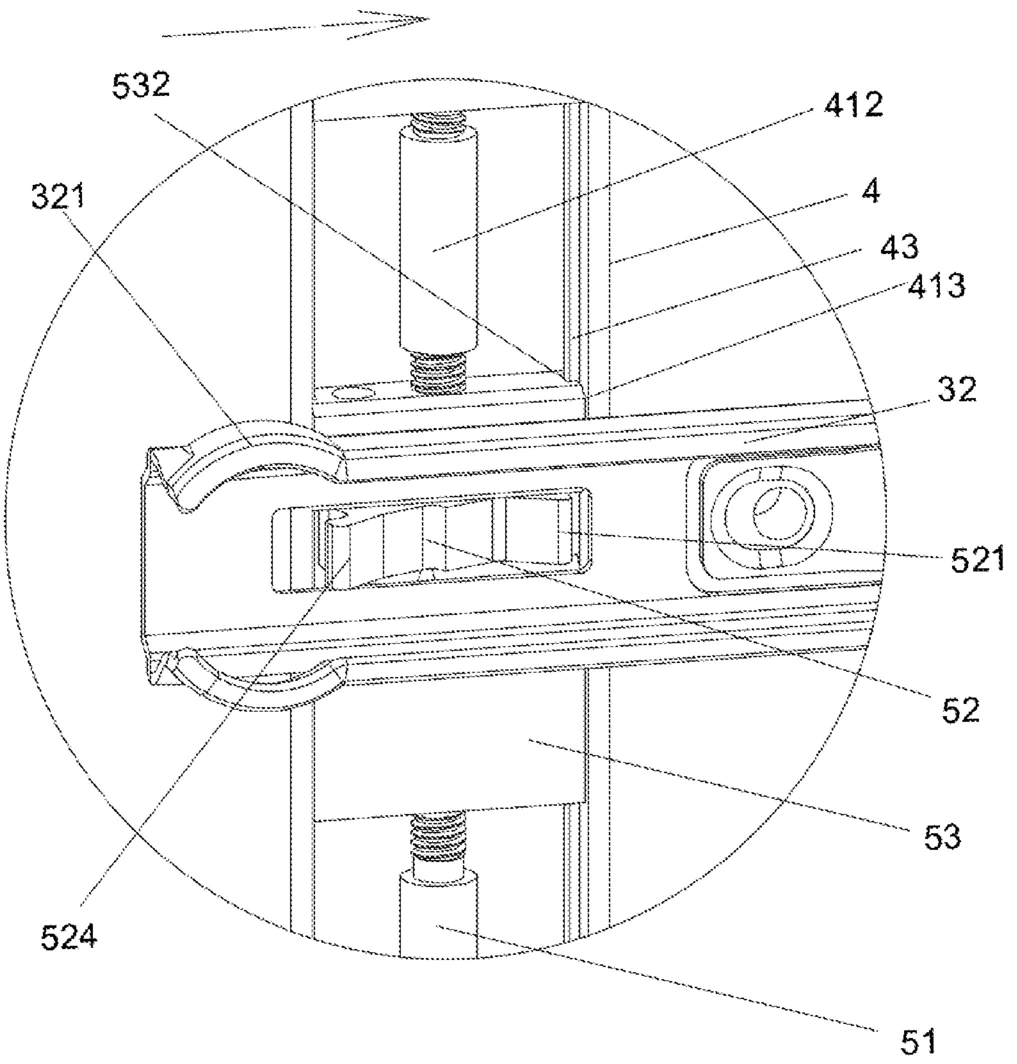
FIG. 6 is a partially enlarged drawing of D in FIG. 5 (an arrow represents a moving direction of a drive member).

In the embodiment, as shown in FIG. 11, the driver member 33 is a roller, and a center shaft of the roller is rotatably connected to the end of the drawer slide rail 31; this is the prior art, which is not repeatedly described:

As shown in FIG. 3, FIG. 5, and FIG. 6, the end of the cabinet slide rail 32 is provided with an arc-shaped groove 321 matched with the roller; and in a closed state of the drawer, the roller is located in the arc-shaped groove 321. In the closed state of the drawer, the arc-shaped groove 321 plays a limiting role to prevent the roller from sliding out easily.

Figure 7:
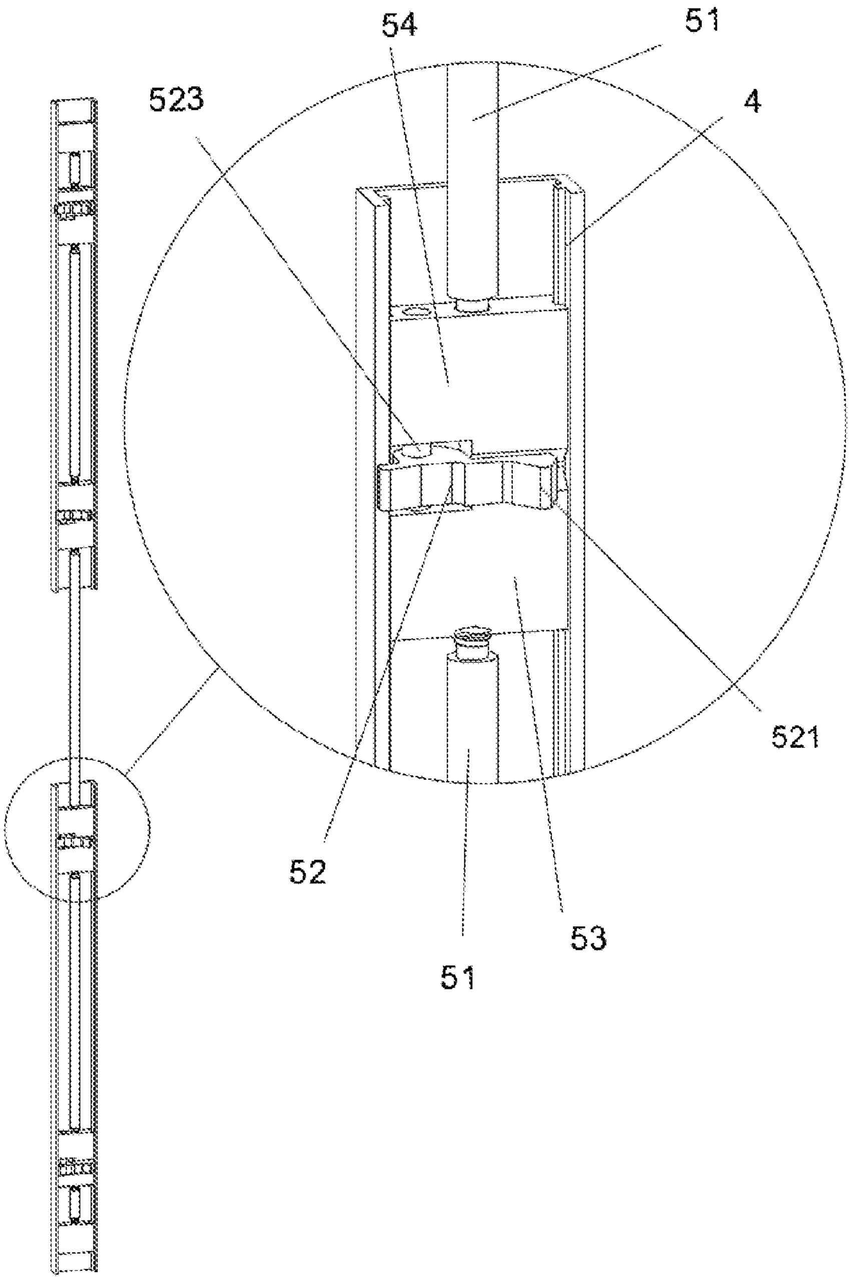
FIG. 7 is a structural schematic diagram of a track seat of the embodiment 1.
Figure 8:
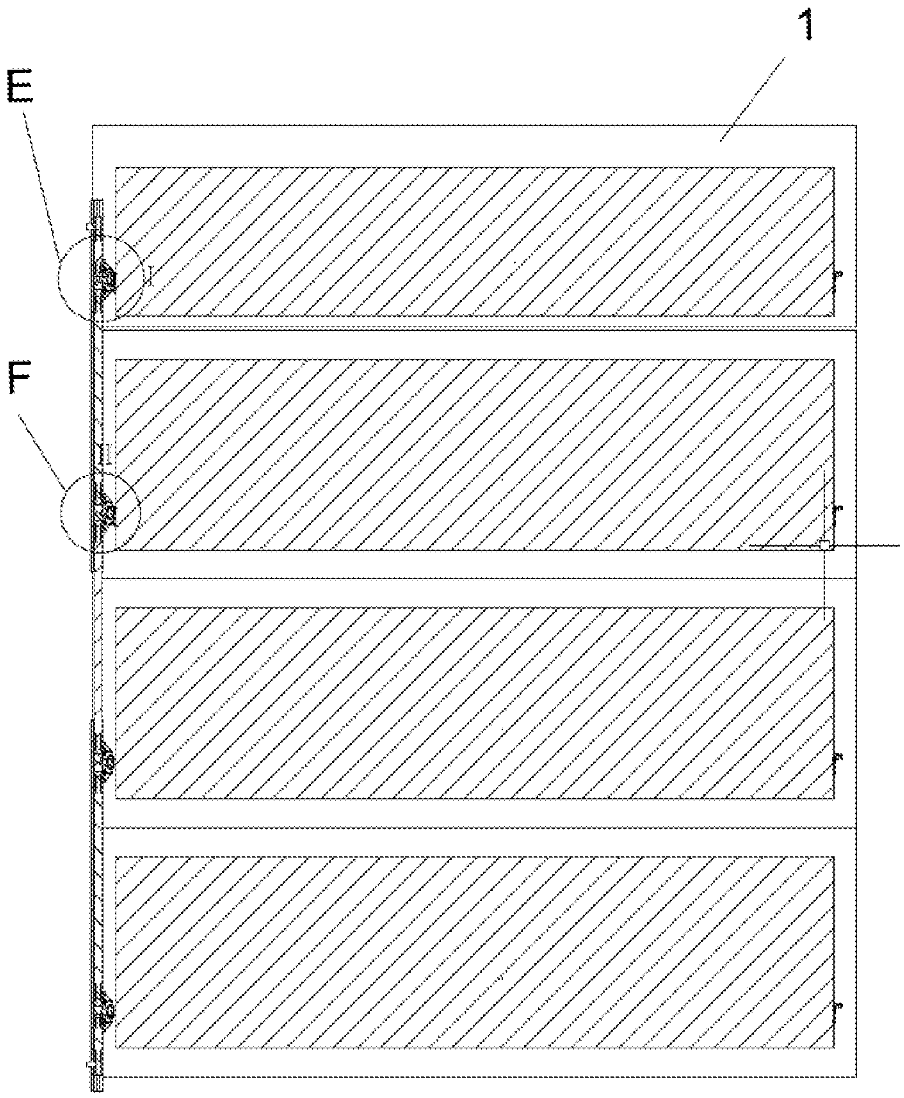
FIG. 8 is a longitudinal section view of the embodiment 1 (with the drawer in the first layer in the opened state).

In the embodiment, as shown in FIG. 7, FIG. 8, and FIG. 11, both ends of the opening block 52 are rotatably connected to the functional blocks (the functional block A 53 and the functional block B 54) of the two adjacent self-locking adjustment assemblies through a rotating shaft 523;

A surface of the opening block 52 contacting with the drive member 33 is provided with a cam structure 521, and the cam structure 521 is a first protrusion extending toward a side close to the drawer 2 on a surface of the opening block 52 close to the drive member 33.

As shown in FIG. 8 and FIG. 10, a surface of the opening block 52 away from the drive member 33 is provided with a first sloping structure 522, the functional block (i.e., the functional block A 53 or the functional block B 54) is provided with a second sloping structure 531 matched with the first sloping structure 522, and the drive member 33 is moved to contact with the cam structure 521 to drive the opening block 52 to rotate, so that the first sloping structure 522 enters between the two functional blocks or between the functional block and the fixing assembly to push away the functional block and the fixing assembly.

In the embodiment, preferably, both the upper and lower side surfaces of the opening block 52 are provided with the first sloping structures 522 (the first sloping structure located on the upper surface inclines obliquely downwards, and the first sloping structure located on the lower surface inclined obliquely upwards); the opposite sides of the two functional blocks (i.e., the functional block A 53 and the functional block B 54) both are provided with the second sloping structures 531; and when the first sloping structure 522 of the opening block 52 enters between the two functional blocks (i.e., the functional block A 53 and the functional block B 54), the two functional blocks will be pushed away. Of course, the surface of only one of the functional blocks in the two functional blocks is provided with the second sloping structure to achieve the above objective, with a possible unsmooth pushing process. It is not limited to the above structure as long as the opening block 52 rotates to push away the two functional blocks.

Preferably, as shown in FIG. 6, the surface of the opening block 52 close to the drive member 33 at an end opposite to the first protrusion is provided with a second protrusion 524; when the drawer is closed, the drive member 33 contacts with and pushes the second protrusion 524 to drive the opening block 52 to screw out between the two functional blocks (i.e., the functional block A 53 and the functional block B 54) or between the functional block and the fixing block 413; and the corresponding functional block or fixing block are reset to the state where the drawer is closed.

In the embodiment, preferably, as shown in FIG. 3, threaded sections 511 with external threads are arranged at both ends of the connecting rod 51, the functional blocks (i.e., the functional block A 53 and the functional block B 54) are provided with corresponding threaded holes (not shown in the drawing), and the connecting rod 51 is in threaded connection to the functional blocks; and a distance between adjacent drawers 2 can be adjusted by adjusting depths of both ends of the connecting rod 51 screwed into the threaded holes.

Under circumstance of not considering the processing errors of the cabinet, both ends of the connecting rod 51 can be fixedly connected to the two functional blocks (i.e., the functional block A 53 and the functional block B 54), and even the three are processed into an integrated connector. However, in consideration of problems such as the processing errors of the cabinet and wear after long-term use, a threaded connection is preferably adopted. The distance between the adjacent drawers 2 can be adjusted by adjusting the depths of both ends of the connecting rod 51 screwed into the threaded holes, which makes up the processing errors, and the like.

In addition, the track seat can either be an integral whole or be formed by splicing multiple segments.

In the embodiment, as shown in FIG. 2, FIG. 3, FIG. 5, and FIG. 6, each of the fixing assemblies includes a protecting cover 411, a fixing rod 412, and a fixing block 413, the protecting cover 411 is fixed to the track seat 4, both ends of the fixing rod 412 are in threaded connection to the protecting cover 411 and the fixing block 413, respectively, and depths of both ends of the fixing rod 412 respectively screwed into the protecting cover 411 and the fixing block 413 can be adjusted. The principle is similar to the adjusting mode for the connecting rod 51 and the two functional blocks (i.e., the functional block A 53 and the functional block B 54), and it is also adjusted by adjusting the depths of both ends of the fixing rod 412 screwed into the threaded holes of the protecting cover 411 and the fixing block 413 to make up the processing errors of the furniture drawers.

In the embodiment, the layers of the drawers are one more than the self-locking adjustment assemblies.

In the embodiment, by taking the four layers of drawers 2 as an example, as shown in FIGS. 1-2, when there are four layers of drawers 2, there are three self-locking adjustment assemblies 5, the upper fixing assembly 41 is located at the upper end of the track seat 4, the lower fixing assembly 42 is located at the lower end of the track seat, there are three self-locking adjustment assemblies 5 in the middle, and an opening block is further arranged between the lowest three self-locking adjustment assembly 5 and the lower fixing assembly 42.

As shown in FIG. 5 and FIG. 6, a side surface of the track seat 4 is provided with a limiting convex rib 43 extending in a height direction, a side surface of the functional block (i.e., the functional block A 53 or the functional block B 54) is provided with a limiting groove 532 matched with the limiting convex rib 43, and the limiting convex rib 43 can be clamped into the limiting groove 532. The limiting groove 532 is matched with the limiting convex rib 43 to play limiting and guiding roles, so that the functional blocks slide up and down conveniently.

An assembling process of the drawer furniture is as follows: the depth of each connecting rod 51 and fixing rod 412 screwed into the functional block (i.e., the functional block A 53 or the functional block B 54) or the fixing block 413 is adjusted according to the processing errors of the cabinet, then the interlink lock mechanism is mounted on the cabinet 1 of the furniture, the drawer slide rail 31 and the drive member 33 on the drawer 2 are mounted, and then the drawer can be directly mounted on the cabinet without adjusting the height of the interlink lock mechanism, so that the drawer furniture is convenient to assemble. The working principle and the working process of the present application are as follows:

as shown in FIG. 2, FIG. 8, and FIG. 10, when the first layer of drawer is pulled, the roller of the drawer pushes the cam structure 521 of the opening block 52 to work to drive the opening block to rotate: as the opening block 52 is provided with the first sloping structure 522 and the corresponding functional block A 53 is provided with the second sloping structure 531, the functional block A 53 is pushed under the pushing action of the sloping structures to move downwards and only the functional block A 53 of the adjacent self-locking adjustment assembly can be pushed to move downwards; as the connecting rod 51 is fixedly connected to the functional block A 53 and the functional block B 54 is also fixedly connected to the connecting rod 51, the connecting rod 51 and the functional block B 54 will be driven to move downwards; the acting force is transferred though the side walls of the track seat 4 and the cabinet 1; moreover, as the gap between the fixing block 413 of the upper fixing assembly 41 and the fixing block 413 of the lower fixing assembly 42 can allow only one opening block 52 to rotatably enter between the two functional blocks or one functional block and one fixing block (as shown in FIG. 9), the rollers of other self-locking adjustment assemblies will be clamped and cannot move (as shown in FIG. 10), and thus, the second layer of drawer can be prevented from being pulled open incidentally:

meanwhile, in the above process, as the protecting cover 411 of the upper fixing assembly 41 is fixed to the track seat 4, the fixing rod 412 is fixedly connected to the protecting cover 411, and the fixing block 413 is also fixedly connected to the fixing rod 412, the opening block 52 will not drive the fixing block 413 to move during rotation; and when the two layers of drawers are pulled at the same time, for example, the first layer of drawer and the second layer of drawer are pulled at the same time, the two opening blocks 52 will rotate at the same time, and in this case, the functional block B 54 at the second drawer moves upwards, and the functional block A 53 at the first drawer moves downwards; moreover, as the gap between the fixing block 413 of the upper fixing assembly 41 and the fixing block 413 of the lower fixing assembly 42 allows only one opening block to rotatably enter between the two functional blocks or between one functional block and one fixing block, the two opening blocks cannot rotate at the same time and push away the corresponding functional blocks. Thus, the opening blocks will extrude, so that the two layers of drawers cannot be opened at the same time, and the drawers in other layers cannot be opened by parity of reasoning in a similar way.

In a process that a certain layer of drawer 2 is opened, the acting force which prevents the adjacent layer of drawer 2 from being opened will be transferred to the functional block and then the side wall of the cabinet 1 through the opening block 52, so that the blocking force will be enhanced, and thus, the purpose of opening the two drawers 2 at the same time cannot be achieved.

In addition, as shown in FIG. 1 and FIG. 2, when all layers of drawers are in the closed state, all the components of the interlink lock mechanism do not apply forces continuously, so that the service life is prolonged.

Figure 12:
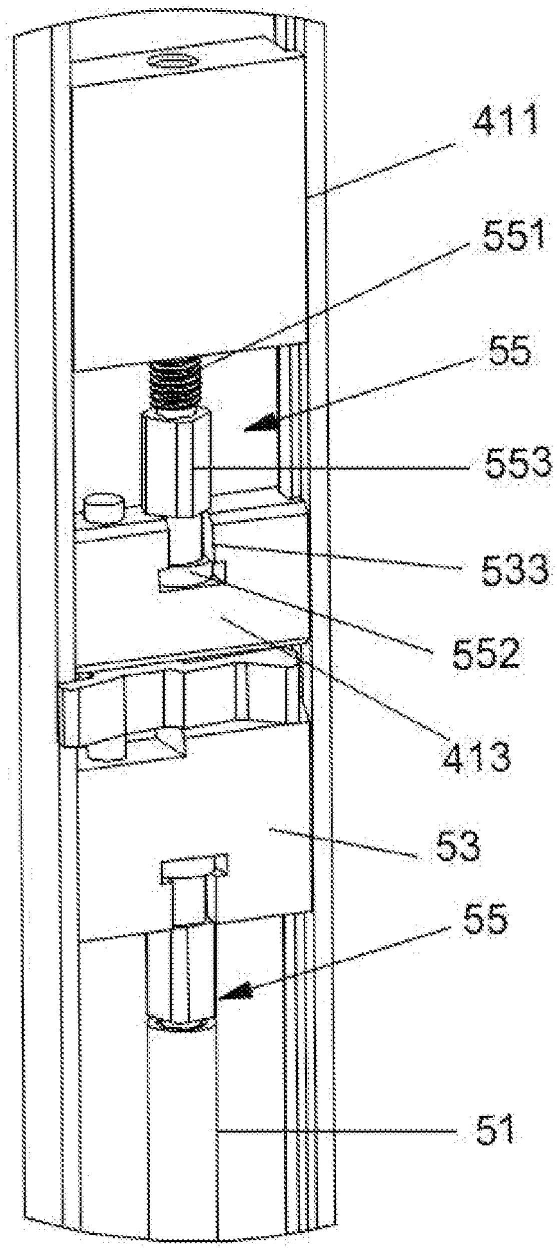
FIG. 12 is a schematic structural diagram of an upper fixing assembly in an embodiment 2.
Figure 13:
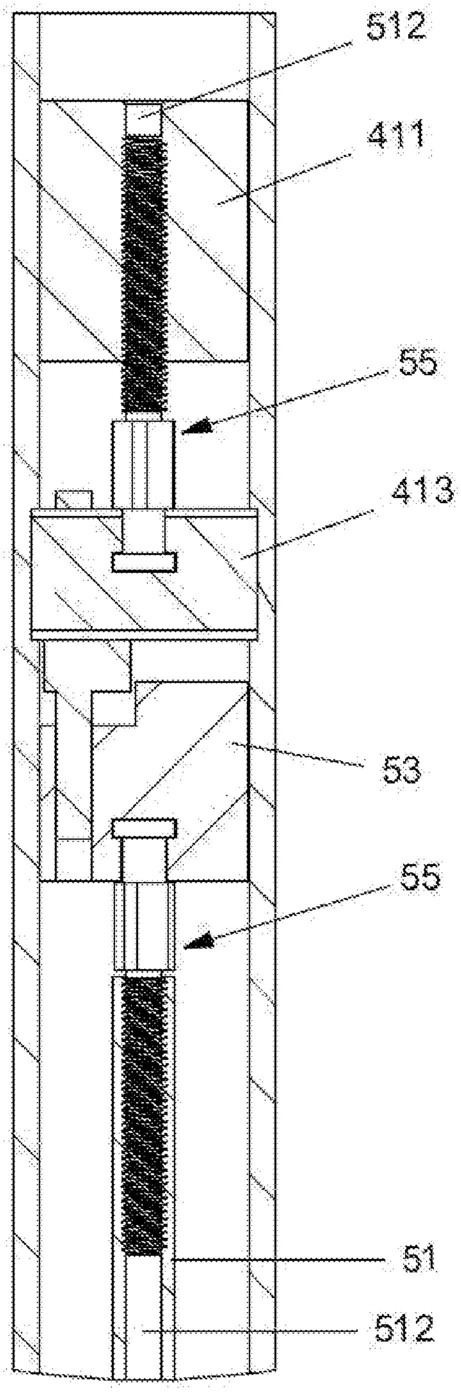
FIG. 13 is a longitudinal section view of the upper fixing assembly in the embodiment 2.

Embodiment 2: an interlink lock mechanism for multi-layered drawer furniture, as shown in FIG. 12 and FIG. 13, the structure is similar to that in the embodiment 1, but the difference lies in that the connecting modes between the connecting rod 51 and the functional blocks (i.e., the functional block A 53 and the functional block B 54) and between the fixing block 413 and the protecting cover 411 are different, specifically shown as follows:

both ends of the connecting rod 51 are connected to the functional blocks through adjusting members 55, both ends of the connecting rod 51 are provided with threaded cavities 512, each of the adjusting members 55 is provided with a screw 551 with a thread, one end of the adjusting member 55 is connected to the functional block, and meanwhile, the screw 551 is inserted into the threaded cavity 512 of the connecting rod and the insertion depth can be adjusted.

Each of the fixing assemblies includes a protecting cover 411, the adjusting member 55, and a fixing block 413, the adjusting member 55 is provided with the screw 551 with the thread, the protecting cover is provided with the threaded cavity 512, one end of the adjusting member is connected to the fixing block, and the depth of the screw of the adjusting member inserted into the threaded cavity of the protecting cover can be adjusted.

The functional block and/or the fixing block 413 are respectively provided with a T-shaped groove 533, one end of the adjusting member 55 is provided with a hanging table 552, and the hanging table 552 is clamped into the T-shaped groove 533. In the embodiment, the other side of the adjusting member located on the hanging table is provided with a polygonal tightening portion 553 convenient to clamp a wrench.

The function and effect of the above structure are similar to those in the embodiment 1. The depths of the screws screwed into the threaded cavities are also adjusted to make up the dimensional processing errors of the furniture drawers. However, in the embodiment, one adjusting member is additionally arranged between the functional block and the connecting rod; the adjusting member is further connected to the connecting rod with the threaded cavity; the screw is screwed by a tool, so that the purpose of adjusting the height by adjusting the depth of the screw inserted into the threaded cavity, and therefore, it is quite convenient; further, in this way, the adjusting member is mounted in a standardized manner; with respect to drawers with different heights, it is only needed to pick up the connecting rods with corresponding heights, so that it is quite convenient; uniform management of parts in a production field is also facilitated, so that the production field is more orderly; and moreover, in the using process, even if a single adjusting member or connecting rod is damaged, it is only needed to replace the corresponding adjusting member or connecting rod, so that the maintenance cost is lowered.

What is described above is merely the preferred implementations of the present application rather than limiting the present application. It shall be noted that for those of ordinary skill in the art, they may make several improvements and modifications without deviating from the principle of the present application, and these improvements and modifications shall fall within the protection scope of the present application.

What is claimed is:

1. A multi-layered drawer furniture with an interlink lock mechanism, the drawer furniture comprising a cabinet and at least two drawers distributed up and down in the cabinet, a guide rail assembly configured to be arranged between each said drawer and the cabinet, and the guide rail assembly comprising a drawer slide rail configured to be mounted on a side surface of the drawer, a cabinet slide rail configured to be mounted on the cabinet, and a drive member arranged at an end of the drawer slide rail, and the drawer slide rail being matched with the cabinet slide rail and the drive member being capable of sliding along the cabinet slide rail, wherein the interlink lock mechanism is mountable to a side wall of the cabinet, and the interlink lock mechanism includes a track seat, fixing assemblies located at both ends of the track seat, and a plurality of self-locking adjustment assemblies located on the track seat, the track seat is mountable in a height direction of the cabinet, and the plurality of self-locking adjustment assemblies being arranged at an interval in a height direction of the track seat, wherein the drive member is a roller, and a center shaft of the roller is rotatably connected to the end of the drawer slide rail; the end of the cabinet slide rail is provided with an arc-shaped groove matched with the roller; and in a closed state of the drawer, the roller is located in the arc-shaped groove;

each of the self-locking adjustment assemblies comprises a connecting rod, an opening block, and two functional blocks, wherein the functional blocks are slidably connected to the track seat, two adjacent said self-locking adjustment assemblies are defined as an upper self-locking adjustment assembly and a lower self-locking adjustment assembly, the two functional blocks of one said self-locking adjustment assembly are defined as a functional block A and a functional block B, an upper end of the connecting rod is connected to the functional block A, and a lower end of the connecting rod is connected to the functional block B;

the fixing assemblies located at both ends of the track seat are respectively defined as an upper fixing assembly and a lower fixing assembly, and the upper fixing assembly is located above the self-locking adjustment assembly adjacent thereto; and the lower fixing assembly is located below the self-locking adjustment assembly adjacent thereto, and one said opening block is further arranged between the upper fixing assembly and the lower fixing assembly;

a gap between a lower end of the upper fixing assembly and an upper end of the lower fixing assembly can allow only one said opening block to rotatably enter between the two functional blocks or between one said functional block and one said fixing block; and the opening block is located between the two functional blocks of the two adjacent said self-locking adjustment assemblies, the opening block is rotatably connected to the functional blocks, to adjust a distance between the two functional blocks depending on whether the opening block is rotated;

and when the opening block is located between one said fixing assembly and the functional block of one self-locking adjustment assembly, the opening block is rotatably connected to the fixing assembly and the functional block, to adjust a distance between the fixing assembly and the functional block depending on whether the opening block is rotated.

2. The multi-layered drawer furniture according to claim 1, wherein both ends of the opening block are rotatably connected to the functional blocks of the two adjacent said self-locking adjustment assemblies through a rotating shaft; and a surface of the opening block contacting with the drive member is provided with a cam structure, a surface of the opening block away from the drive member is provided with a first sloping structure, the functional block is provided with a second sloping structure matched with the first sloping structure, and the drive member is moved to contact with the cam structure to drive the opening block to rotate, so that the first sloping structure enters between the two functional blocks or between the functional block and the fixing assembly to push away the functional block and the fixing assembly.

3. The multi-layered drawer furniture according to claim 2, wherein the cam structure is a first protrusion extending toward a side close to the drawer on a surface of the opening block close to the drive member.

4. The multi-layered drawer furniture according to claim 3, wherein the surface of the opening block close to the drive member at an end opposite to the first protrusion is provided with a second protrusion, and the second protrusion is pushed by the drive member to drive the opening block to move from between the two functional blocks or between one said functional block and one said fixing assembly.

5. The multi-layered drawer furniture according to claim 2, wherein threaded sections with external threads are arranged at both ends of the connecting rod, and thread directions of the threaded sections are opposite, the functional blocks are provided with corresponding threaded holes, and the connecting rod is in threaded connection to the functional blocks; and a distance between adjacent said drawers can be adjusted by adjusting depths of both ends of the connecting rod screwed into the threaded holes.

6. The multi-layered drawer furniture according to claim 1, wherein each of the fixing assemblies comprises a protecting cover, a fixing rod, and a fixing block, the protecting cover is fixed to the track seat, both ends of the fixing rod are in threaded connection to the protecting cover and the fixing block, respectively, and depths of both ends of the fixing rod respectively screwed into the protecting cover and the fixing block can be adjusted.

7. The multi-layered drawer furniture according to claim 1, wherein a side surface of the track seat is provided with a limiting convex rib extending in a height direction, a side surface of the functional block is provided with a limiting groove matched with the limiting convex rib, and the limiting convex rib can be clamped into the limiting groove.

8. The multi-layered drawer furniture according to claim 1, wherein the layers of the drawers are one more than the self-locking adjustment assemblies.

9. The multi-layered drawer furniture according to claim 1, wherein both ends of the connecting rod are respectively connected to the functional block through adjusting members, both ends of the connecting rod are provided with threaded cavities, each of the adjusting members is provided with a screw with a thread, one end of the adjusting member is connected to the functional block, and meanwhile, the screw is inserted into the threaded cavity of the connecting rod and an insertion depth can be adjusted.

10. The multi-layered drawer furniture according to claim 9, wherein the functional block is provided with a T-shaped groove, one end of the adjusting member is provided with a hanging table, and the hanging table is clamped into the T-shaped groove.

11. The multi-layered drawer furniture according to claim 1, wherein each of the fixing assemblies comprises a protecting cover, an adjusting member, and a fixing block, the adjusting member is provided with a screw with a thread, the protecting cover is provided with a threaded cavity, one end of the adjusting member is connected to the fixing block, and a depth of the screw of the adjusting member inserted into the threaded cavity of the protecting cover can be adjusted.

12. The multi-layered drawer furniture according to claim 11, wherein the functional block and the fixing block are respectively provided with a T-shaped groove, one end of the adjusting member is provided with a hanging table, and the hanging table is clamped into the T-shaped groove.

* * * * *